June 18, 1963 — T. BOWMER — 3,094,310
BLADES FOR FLUID FLOW MACHINES
Filed Nov. 14, 1960 — 2 Sheets-Sheet 1
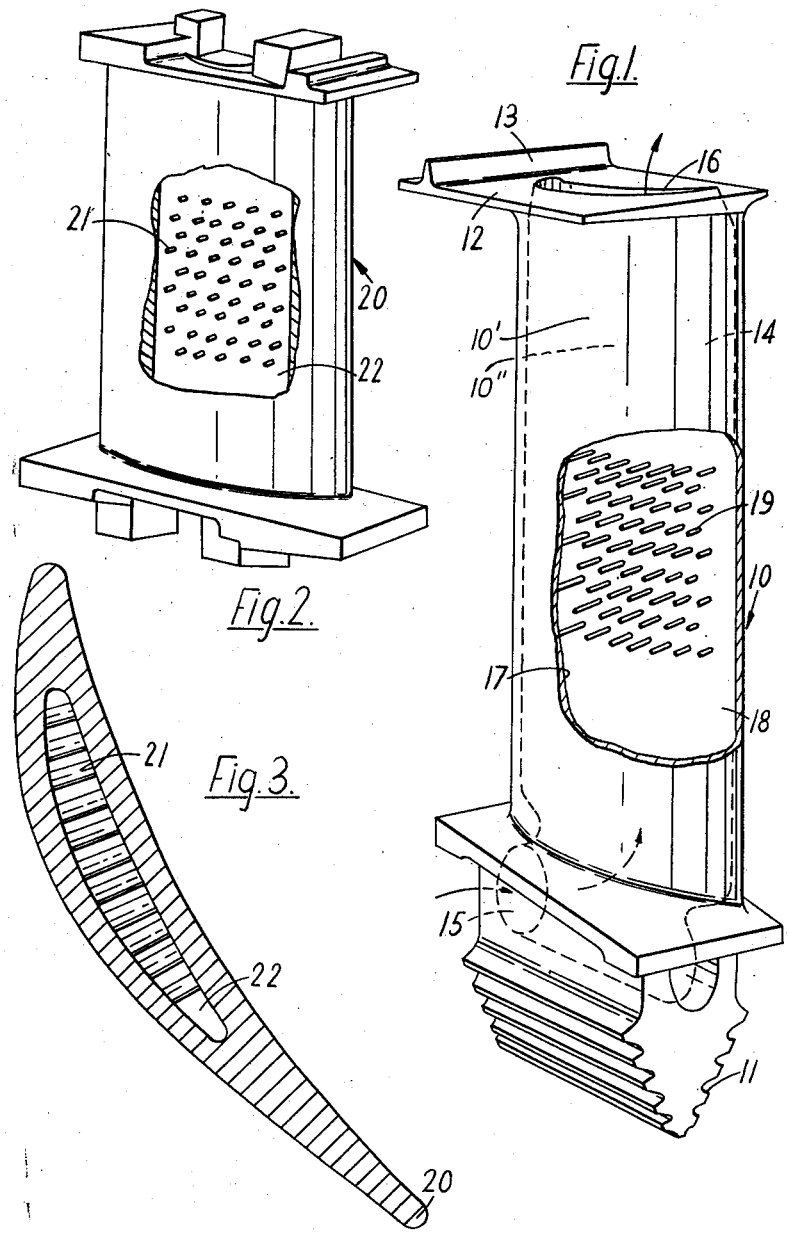

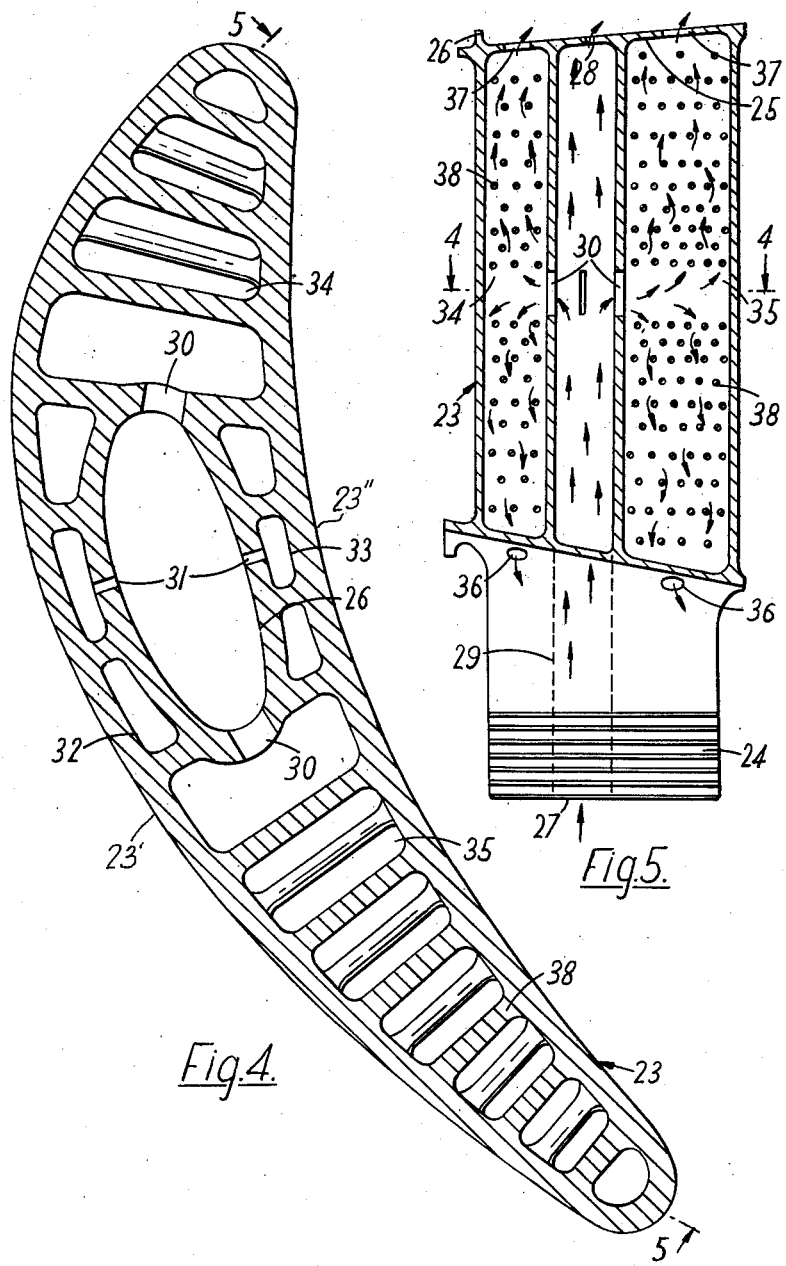

though not shown, the high pressure turbine blade of a gas turbine engine.

United States Patent Office 3,094,310
Patented June 18, 1963

3,094,310
BLADES FOR FLUID FLOW MACHINES
Thomas Bowmer, Wollaton, England, assignor to Rolls-Royce Limited, Derby, England, a British company
Filed Nov. 14, 1960, Ser. No. 68,729
Claims priority, application Great Britain Dec. 9, 1959
3 Claims. (Cl. 253—39.15)

This invention concerns the cooling of blades (e.g. turbine rotor or turbine stator blades) employed in fluid flow machines, such, for example, as gas turbine engines.

The term "blade" is used in this specification in a wide sense to include blade-like members such as nozzle guide vanes.

According to the present invention there is provided a blade which is adapted for use in a fluid flow machine, said blade having an internal passage therethrough for a flow of cooling fluid, and turbulence generating means for producing substantial turbulence in the cooling fluid flowing through said internal passage.

Such turbulence will cause breaking up of the boundary layer of the cooling fluid (e.g. cooling air) which flows in contact with the walls of the said internal passage, whereby the heat transfer coefficient between the blade and the cooling fluid will be improved.

The turbulence generating means may be arranged to produce greater turbulence in those parts of the blade which, in operation, are subjected to the maximum heating.

The turbulence generating means may comprise one or more baffle members projecting into or across said passage so as to impede the flow therethrough of cooling fluid. Thus there may be a plurality of baffle members which are relatively closely spaced in those parts of the blade which are subjected to the maximum heating and which are relatively widely spaced elsewhere.

Means are preferably provided for causing the cooling fluid to be directed onto an internal surface of one or more localised parts of said blade prior to its flowing longitudinally through said internal passage.

The baffle members may extend between oppositely disposed walls of said internal passage and the said oppositely disposed walls may be respectively disposed adjacent the leading and trailing edges of the blade.

The blade may be provided with a plurality of said internal passages which extend longitudinally of the blade, the blade also being provided with a longitudinally extending duct which communicates with said internal passages and which is adapted to be supplied with cooling fluid. Preferably the duct communicates with the internal passages midway of the length of the duct, each internal passage being provided with cooling fluid outlet ports adjacent the root and tip of the blade respectively.

The invention also comprises a fluid flow machine provided with a blade as set forth above.

The invention is illustrated merely by way of example, in the accompanying drawings, in which:

FIGURE 1 is a diagrammatic perspective view of a turbine blade in accordance with the present invention, the blade being partly broken away to illustrate its internal construction, FIGURE 2 is a diagrammatic perspective view of a nozzle guide vane in accordance with the present invention, the vane being partly broken away to illustrate its internal construction, FIGURE 3 is a cross section through the nozzle guide vane of FIGURE 2, and FIGURES 4 and 5 are respectively a transverse section and a longitudinal view partly in section, through another turbine blade in accordance with the present invention, FIGURES 4 and 5 being taken respectively on the line 4—4 of FIGURE 5 and 5—5 of FIGURE 4.

In FIGURE 1 there is shown a cast turbine blade 10 having fluid directing faces 10' and 10", the blade being adapted for use in a gas turbine engine. The blade 10 has at its root a "fir-tree" portion 11 which is adapted to be received within a radial locating slot in the rim of the turbine disc (not shown). At its tip, the blade 10 is provided with a platform 12 having a flange 13 which is in sealing relationship with the stator casing (not shown).

The blade 10 has an internal longitudinal passage 14 extending from the root to the tip of the blade. Cooling air (e.g. from the compressor of the engine) may enter the passage 14 through a cooling fluid supply duct or aperture 15 in the root of the blade and may leave the passage 14 through an aperture 16 in the tip of the blade.

The passage 14 has oppositely disposed internal walls 17, 18 which are respectively disposed adjacent the leading and trailing edges of the blade. Transversely elongated baffle bars 19 extend between the walls 17, 18, the bars 19 being cast integrally with the blade and extending transversely of the passage 14 at right angles to the mid-chord line of the blade as shown in FIGURE 3. The bars 19 are arranged in staggered rows.

It will be appreciated that the bars 19 produce turbulence in the flow of cooling air through the passage 14 and this tends to break up boundary layer flow whereby to promote heat transfer between the walls 17 and 18 and the cooling air. Such heat transfer is also promoted by reason of the fact that the bars 19 increase the surface area open to the heat transfer.

The blade illustrated in FIGURE 1 may be produced by precision casting and the bars 19 may, if desired, be so spaced as to limit the flow through the passage 14 to a desired value and/or to cause increased turbulence at and hence give preferential cooling to localised hot spots.

In FIGURES 2 and 3 the invention is shown as being applied to a nozzle guide vane 20 having a plurality (e.g. nine) of staggered rows of baffle bars 21 extending transversely across an internal longitudinal passage 22. The bars 21 are arranged over some 40% of the span of the vane. It will be noted that, chordwise, the passage 22 extends through a central portion only of the nozzle guide vane 20.

In one practical embodiment of the invention, the bars 21 of the vane 20 were given a diameter of about 0.025" and their center lines were spaced by 0.150". It was then found that the average cooling at the mean section of the vane 20 was approximately twice as great as it was in the case of a similar nozzle guide vane 20 in which the bars 21 were absent. The bars 21 were, moreover, found to promote cooling in the particular regions in which they were disposed.

Referring now to FIGURES 4 and 5, a cast H.P. turbine blade 23 of a gas turbine engine comprises a "fir-tree" root portion 24 and a tip 25 having a sealing flange 26. The blade 23 has the usual fluid directing faces 23' and 23".

The blade 23 has a centrally disposed, longitudinally-extending cooling fluid supply duct 29 therein. The duct 29 is adapted to be supplied with cooling air through an aperture 27 in the root portion 24, some of the air supplied to the duct 29 escaping through a small hole 28 in the tip 25.

Midway of its length the duct 29 is provided with a pair of diametrically spaced large apertures 30 and with a pair of diametrically spaced small apertures 31. The latter apertures 31 serve to direct some of the cooling air flowing through the duct 29 onto the mid-height regions of the internal walls 32, 33 of the blade 23. Thus jets of cooling air are directed onto what are, in operation, the hottest parts of the blade.

The major portion of the air flowing through the duct 29 passes through the holes 30 and into two longitudinally extending internal passages 34, 35 solely immediately adjacent the mid-height of the blade. Air outlet ports 36, 37 are provided in each of the passages 34, 35 at the root and tip portions of the blade respectively.

Baffle bars 38, which extend between the walls 32, 33 are disposed across the passages 34, 35 at right angles to the mid-chord line of the blade as shown in FIGURE 5. The bars 38 are arranged in chordwise extending rows, the rows being staggered with respect to each other and relatively closely spaced adjacent the apertures 30 and being relatively widely spaced adjacent the root and tip of the blade. Accordingly the air flowing through the passages 34, 35 would be made most turbulent (and therefore most effective to promote cooling) in the central part of the blade which becomes the hottest part thereof.

I claim:
1. A blade adapted for use in a fluid flow machine, said blade having root and tip ends, leading and trailing edges and fluid directing faces, said blade also having opposed interior walls defining an internal passageway extending longitudinally of and adjacent one of said edges, said blade having a cooling fluid supply duct adapted to be supplied with cooling fluid and in communication with said internal passageway solely immediately adjacent the mid-height of the blade for directing a single stream of cooling fluid against the wall of said passageway adjacent said one edge, the cooling fluid thereafter forming a longitudinal flow through said passageway, said internal passageway having at least one outlet at a point remote from the communication of said internal passageway with said cooling fluid supply duct, a plurality of bars extending across said passageway at right angles to the mid-chord line of the blade, each of said bars being individually supported in said passageway at its ends only by the respective opposed interior walls of the passageway, said bars being arranged in a plurality of chordwise extending rows spaced progressively downstream of one another relative to the longitudinal flow of the cooling fluid through said passageway, the bars of each of said rows being staggered with respect to the bars of the immediately preceding row so as to produce substantial turbulence in the longitudinal flow of cooling fluid as it flows through said passageway, and said rows of bars adjacent the mid-height of the blade being more closely spaced than the rows of bars positioned elsewhere in said passageway.

2. A blade adapted for use in fluid flow machines, said blade having root and tip ends, leading and trailing edges and fluid directing faces, said blade having opposed interior walls defining a control passageway therethrough extending over substantially the entire longitudinal extent of the blade between the root and the tip ends and adjacent one of said edges, said blade having a cooling fluid supply duct adapted to be supplied with cooling fluid and in communication with said internal passageway solely immediately adjacent the mid-height of the blade for directing a single stream of cooling fluid against the wall of said passageway adjacent said one edge, said internal passageway having outlets at opposite ends thereof so that cooling fluid after being directed against said wall divides and flows longitudinally in opposite directions through the passageway, a plurality of bars extending across said passageway at right angles to the mid-chord line of the blade, each of said bars being individually supported in said passageway at its ends only by the respective walls of said blade, said bars being arranged in a plurality of chordwise extending rows spaced progressively downstream of one another relative to the longitudinal flow of cooling fluid through said passageway, the bars of each of said rows being staggered with respect to the bars of the immediately preceding row so as to produce substantial turbulence in the longitudinal flow of cooling fluid as it flows through said passageway, and said rows adjacent the mid-height of the blade being more closely spaced than the rows positioned elsewhere in said passageway.

3. A blade adapted for use in a fluid flow machine, said blade having root and tip ends, leading and fluid directing faces, said blade having two pairs of opposed walls defining two internal passageways each extending over substantially the entire longitudinal extent of the blade, one of said passageways being adjacent one of said edges of the other of said passageways being adjacent the other of said edges, said blade having a cooling fluid supply duct disposed between said passageways and adapted to be supplied with cooling fluid, said cooling fluid supply duct communicating with each of said passageways solely immediately adjacent the mid-height of the blade and serving to direct a single stream of cooling fluid against the wall of each of said passageways adjacent its respective edge, each of said passageways having outlets at opposite ends thereof so that cooling fluid after being directed against the walls of the respective passageways divides and flows longitudinally in opposite directions through each of the respective passageways, a plurality of bars extending across each of said passageways at right angles to the mid-chord line of the blade, each of said bars being individually supported in each of said passageways at its ends only by the respective pairs of walls defining the passageways, said bars being arranged in a plurality of chordwise extending rows spaced progressively downstream of one another relative to the longitudinal flow of the cooling fluid through the respective passageway, the bars of each of said rows being staggered with respect to the bars of the immediately preceding rows so as to produce substantial turbulence in the longitudinal flow of cooling fluid as it passes through each of said passageways, and some of said rows adjacent the mid-height of the blade being more closely spaced than the rows positioned elsewhere in said passageways.

References Cited in the file of this patent

UNITED STATES PATENTS

| 2,750,147 | Smith | June 12, 1956 |
| 2,807,437 | Roush | Sept. 24, 1957 |
| 2,823,894 | Gerdan et al. | Feb. 18, 1958 |
| 2,825,530 | Schum et al. | Mar. 4, 1958 |
| 2,828,106 | Schramm et al. | Mar. 25, 1958 |
| 2,843,354 | Smith | July 15, 1958 |
| 2,866,618 | Jackson | Dec. 30, 1958 |
| 2,883,151 | Dolida | Apr. 21, 1959 |
| 2,921,769 | Flader | Jan. 19, 1960 |
| 2,923,525 | Creek | Feb. 2, 1960 |
| 3,017,159 | Foster et al. | Jan. 16, 1962 |
| 3,051,439 | Hilton | Aug. 28, 1962 |

FOREIGN PATENTS

| 981,599 | France | Jan. 17, 1951 |
| 1,007,303 | France | Feb. 6, 1952 |
| 1,227,773 | France | Mar. 7, 1960 |
| 774,499 | Great Britain | May 8, 1957 |
| 872,705 | Great Britain | July 12, 1961 |